United States Patent
Berger (10) Patent No.: US 11,688,150 B2
(45) Date of Patent: *Jun. 27, 2023

(54) COLOR SPACE MAPPING FOR INTUITIVE SURFACE NORMAL VISUALIZATION

(71) Applicant: Magic Leap, Inc., Plantation, FL (US)

(72) Inventor: Kai Berger, Lake Forest, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/591,427

(22) Filed: Feb. 2, 2022

(65) Prior Publication Data

US 2022/0230407 A1    Jul. 21, 2022

Related U.S. Application Data

(63) Continuation of application No. 17/060,904, filed on Oct. 1, 2020, now Pat. No. 11,276,246.

(60) Provisional application No. 62/909,482, filed on Oct. 2, 2019.

(51) Int. Cl.

| | |
|---|---|
| *G06T 19/20* | (2011.01) |
| *G06T 19/00* | (2011.01) |
| *G02B 27/01* | (2006.01) |
| *G06T 17/20* | (2006.01) |

(52) U.S. Cl.
CPC .......... *G06T 19/20* (2013.01); *G02B 27/0172* (2013.01); *G06T 17/20* (2013.01); *G06T 19/006* (2013.01); *G06T 2219/2012* (2013.01)

(58) Field of Classification Search
None
See application file for complete search history.

(56) References Cited

U.S. PATENT DOCUMENTS

| | | | |
|---|---|---|---|
| 6,724,500 B1 | 4/2004 | Hains et al. | |
| 6,850,221 B1 | 2/2005 | Tickle | |
| 11,276,246 B2 * | 3/2022 | Berger | G06T 17/20 |
| 2005/0057559 A1 | 3/2005 | Komarechka | |

(Continued)

OTHER PUBLICATIONS

ARToolKit: https://web.archive.org/web/20051013062315/http://www.hitl.washington.edu:80/artoolkit/documentation/hardware.htm, archived Oct. 13, 2005.

(Continued)

*Primary Examiner* — Sultana M Zalalee
(74) *Attorney, Agent, or Firm* — Seed IP Law Group LLP (57) ABSTRACT

A color mapping technique that provides an intuitive visualization of surface normals is described. The surface normals can be associated with a mesh for a virtual object to be displayed in augmented reality. The color mapping technique can map a unit sphere in a color space to an octahedron. The vertices of the octahedron can be aligned with prime colors of the color space. To perform the alignment, a rotation and shear matrix can be determined from coordinates for octahedron positions and coordinates of colors in the color space. The rotation and shear can provide that each region of the unit color sphere is dominated by a single prime color, with gradients between prime colors being visually balanced. Surface normals of a mesh for a virtual object can be visualized using the color mapping, and a viewer can readily determine how distant in terms of rotation two surface normals are from each other.

19 Claims, 9 Drawing Sheets (5 of 9 Drawing Sheet(s) Filed in Color)

(56) References Cited

U.S. PATENT DOCUMENTS

| | | |
|---|---|---|
| 2006/0028436 A1 | 2/2006 | Armstrong |
| 2006/0274386 A1 | 12/2006 | Wakazono et al. |
| 2007/0080973 A1 | 4/2007 | Stauder et al. |
| 2007/0081123 A1 | 4/2007 | Lewis |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267367 A1 | 9/2014 | Chong et al. |
| 2014/0267420 A1 | 9/2014 | Schowengerdt |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2019/0266788 A1 | 8/2019 | Huynh-Thu et al. |
| 2020/0007718 A1 | 1/2020 | Lee |
| 2021/0104103 A1 | 4/2021 | Kai |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Holhos, et al., "An octahedral equal area partition of the sphere and near optimal configurations of points," Computers and Mathematics with Applications 67 (2014) 1092-1107.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

(A) Body Mesh - Vertices Colored with Gaussian Weighted Normal Direction (B) Body Mesh - Vertices Colored with Gaussian Weighted Normal Direction (C) Body Mesh - Vertices Colored with Gaussian Weighted Normal Direction (D) Body Mesh - Vertices Colored with Gaussian Weighted Normal Direction (E) Body Mesh - Vertices Colored with Gaussian Weighted Normal Direction (F) Body Mesh - Vertices Colored with Gaussian Weighted Normal Direction

COLOR SPACE MAPPING FOR INTUITIVE SURFACE NORMAL VISUALIZATION

CROSS REFERENCE TO RELATED APPLICATIONS

This application is a continuation of application Ser. No. 17/060,904, filed on Oct. 1, 2020, entitled "COLOR SPACE MAPPING FOR INTUITIVE SURFACE NORMAL VISUALIZATION," which claims the benefit of priority under 35 U.S.C. § 119(e) to U.S. Provisional Application No. 62/909,482, filed on Oct. 2, 2019, entitled "COLOR SPACE MAPPING FOR INTUITIVE SURFACE NORMAL VISUALIZATION," the disclosure of which is hereby incorporated by reference herein in its entirety.

BACKGROUND

Field

This disclosure relates to color mapping of three-dimensional (3D) virtual content that can be used for virtual reality, augmented reality, or mixed reality visualization systems.

Description of the Related Art

Modern computing and display technologies have facilitated the development of virtual reality, augmented reality, and mixed reality systems. Virtual reality, or "VR," systems create a simulated environment for a user to experience. This can be done by presenting computer-generated image data to the user through a head-mounted display. This image data creates a sensory experience which immerses the user in the simulated environment. A virtual reality scenario typically involves presentation of only computer-generated image data rather than also including actual real-world image data.

Augmented reality systems generally supplement a real-world environment with simulated elements. For example, augmented reality, or "AR," systems may provide a user with a view of the surrounding real-world environment via a head-mounted display. However, computer-generated image data can also be presented on the display to enhance the real-world environment. This computer-generated image data can include elements which are contextually-related to the real-world environment. Such elements can include simulated text, images, subjects, etc. Mixed reality, or "MR," systems are a type of AR system which also introduce simulated objects into a real-world environment, but these objects typically feature a greater degree of interactivity. The simulated elements can often times be interactive in real time.

SUMMARY

In some implementations, a color mapping technique provides an intuitive visualization of surface normals. The surface normals can be associated with a mesh for a virtual object to be displayed in augmented reality (e.g., surface normals at vertices of a polygon mesh). The color mapping technique can map a unit sphere in a color space to an octahedron. The vertices of the octahedron can be aligned with prime colors of the color space. To perform the alignment, a rotation and shear matrix can be determined from coordinates for octahedron positions and coordinates of colors in the color space. The rotation and shear can provide that each region of the unit color sphere is dominated by a single prime color, with gradients between prime colors being visually balanced. Surface normals of a mesh for a virtual object can be visualized using the color mapping, and a viewer can readily determine how distant in terms of rotation two surface normals are from each other.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Throughout the drawings, reference numbers may be re-used to indicate correspondence between referenced elements. The drawings are provided to illustrate example implementations described herein and are not intended to limit the scope of the disclosure. Additionally, the figures in the present disclosure are for illustration purposes and are not to scale.

DETAILED DESCRIPTION

Overview

Virtual reality (VR), augmented reality (AR) and mixed reality (MR) systems can include a display which presents computer-generated image data (e.g., still images and/or videos) to a user. In some implementations, the display systems are wearable, which may advantageously provide a more immersive VR/AR/MR experience. The computer-generated image data provided via the display can create the impression of being three-dimensional. This can be done, for example, by presenting stereoscopic image data to the user or by projecting image data such that it appears to have originated from different apparent depth planes.

Figure 1:
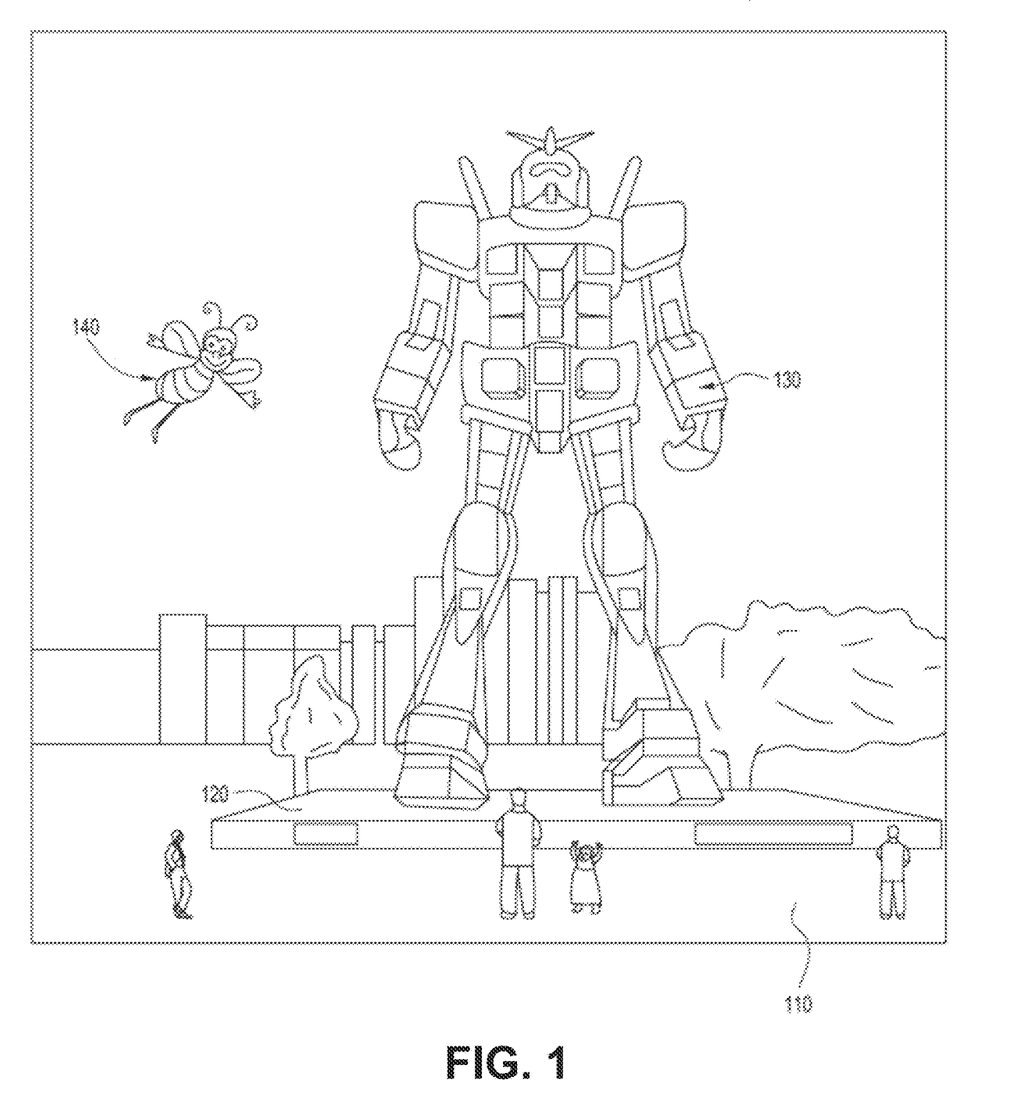
FIG. 1 illustrates a user's view of an augmented reality (AR) scene using an example AR system.

FIG. 1 depicts an example AR/MR scene 100 where a user sees a real-world park setting 110 featuring people, trees, buildings in the background, and a platform 120. In addition to these items, computer-generated image data is also presented to the user. The computer-generated image data can include, for example, a robot statue 130 standing upon the real-world platform 120, and a cartoon-like avatar character 140 flying by which seems to be a personification of a bumblebee, even though these elements 130, 140 are not actually present in the real-world environment.

Figure 2:
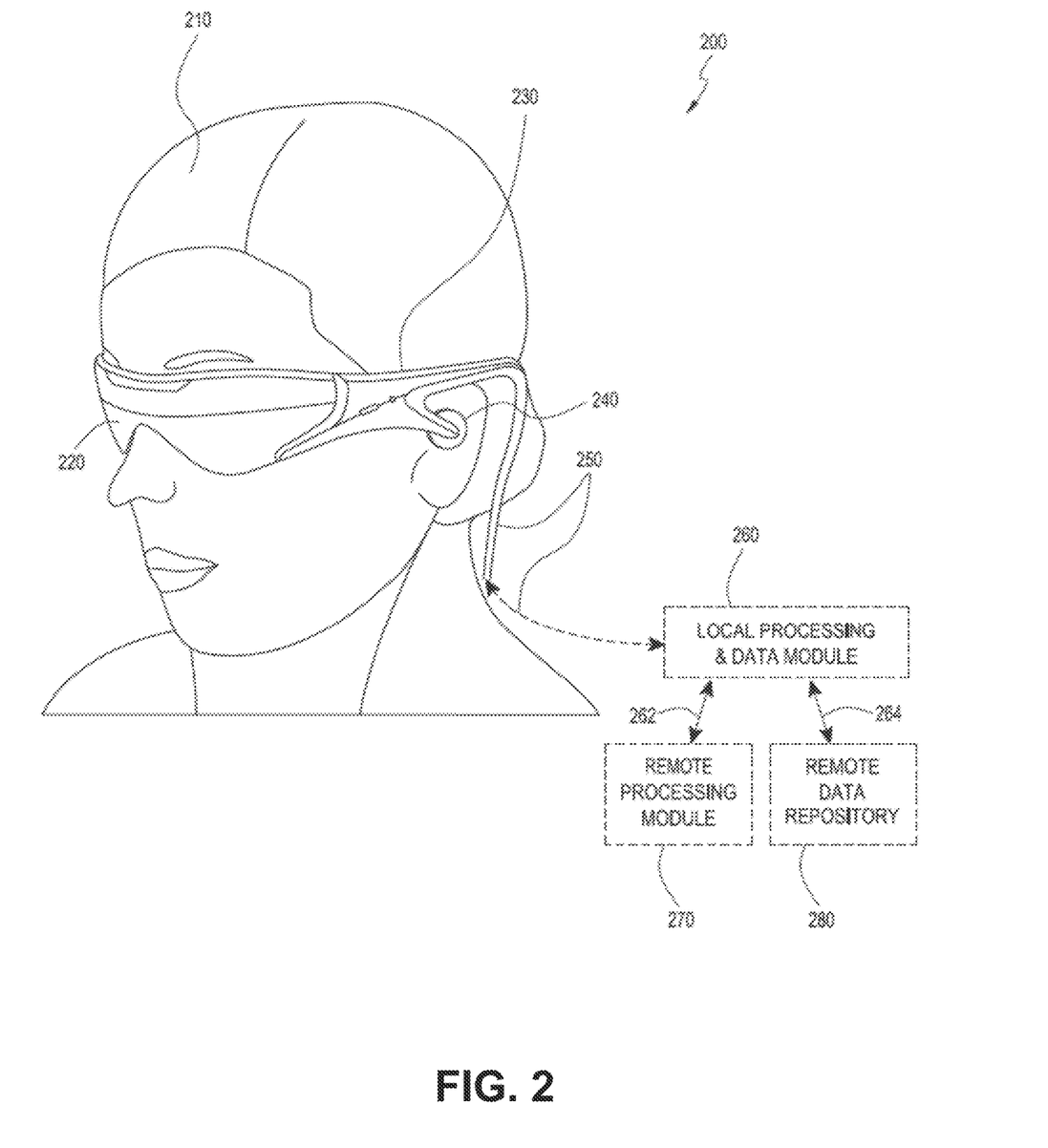
FIG. 2 illustrates an example of a wearable VR/AR/MR display system.

FIG. 2 illustrates an example of a wearable VR/AR/MR display system 200. The VR/AR/MR display system 200 includes a display 220, and various mechanical and electronic modules and systems to support the functioning of that display 220. The display 220 may be coupled to a frame 230, which is wearable by a user 210 and which positions the display 220 in front of the eyes of the user 210. A speaker 240 can be coupled to the frame 230 and positioned adjacent the ear canal of the user. Another speaker, not shown, can be positioned adjacent the other ear canal of the user to provide for stereo/shapeable sound control. The display 220 is operatively coupled, such as by a wired or wireless connection 250, to a local processing and data module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration, etc.).

The local processing and data module 260 may include a hardware processor, as well as digital memory, such as non-volatile memory (e.g., flash memory), both of which may be utilized to assist in the processing and storing of data. This includes data captured from sensors, such as image capture devices (e.g., cameras), microphones, inertial measurement units, accelerometers, compasses, GPS units, radio devices, and/or gyros. The sensors may be operatively coupled to the frame 230 or otherwise attached to the user 210. In some implementations, all data is stored and all computations are performed in the local processing and data module 260, allowing fully autonomous use. Alternatively, or additionally, sensor data may be acquired and/or processed using a remote processing module 270 and/or remote data repository 280. The local processing and data module 260 may be operatively coupled by communication links (262, 264), such as via a wired or wireless communication links, to the remote processing module 270 and the remote data repository 280 such that these remote modules (270, 280) are operatively coupled to each other and available as resources to the local processing and data module 260. In some implementations, the remote processing module 270 may include one or more processors configured to analyze and process data (e.g., sensor data and/or image information). The remote data repository 280 may be a digital data storage facility, which may be available through the internet or other networking configuration in a "cloud" resource configuration.

With access to suitable image data, the VR/AR/MR system 200 is capable of displaying 360° views of a subject (e.g., a person, an object, etc.) such that the user 210 can move around the subject and view it from any perspective as if it were physically present.

Figure 3:
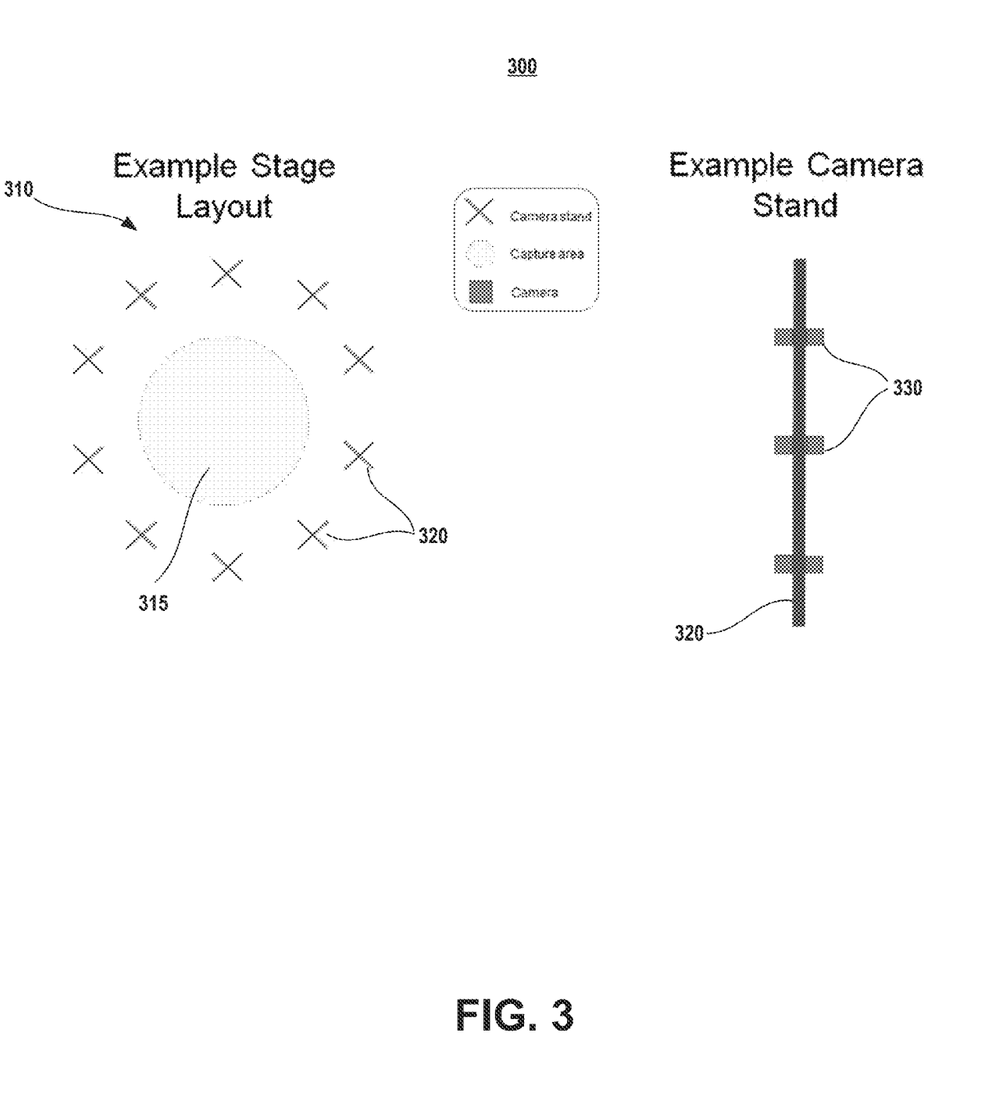
FIG. 3 is a schematic diagram which illustrates an example volumetric capture stage.

FIG. 3 is a schematic diagram which illustrates an example volumetric capture stage 300 for generating 3D virtual representations of objects (e.g., humans, animals, inanimate objects, etc.). The stage 300 is located in an environment 310, which is typically a green screen room. A green screen room is a room with a capture volume 315 surrounded by green screens of the type used in chroma key compositing, which is a post-production video processing technique for compositing images or videos based on their color content. The size of the capture volume can range from several tens of centimeters (e.g., to capture representations of smaller objects or a person's head) to several meters or more (e.g., to capture representations of larger objects or a person's entire body).

The stage 300 includes a plurality of camera stands 320 spread around the perimeter of the capture volume 315 at different locations. Each camera stand 320 can include multiple cameras 330 mounted at different vertical heights, with the cameras being aimed radially inward toward the capture volume 315. The cameras 330 may comprise video cameras that image the volume 315 at a frame rate. In this way, each of the video cameras 330 can film a subject in the capture volume 315 from a different viewpoint. In a typical implementation of a volumetric capture stage 300, the field of view of each of the cameras 330 overlaps with those of adjacent video cameras so as to provide complete coverage of the subject being filmed in the capture area 315.

In some implementations, the cameras 330 are synchronized red-green-blue (RGB) video cameras. In other implementations, the cameras 330 are synchronized red-green-blue-depth (RGB-D or RGBD) video cameras, which each capture images of the subject in the capture volume 315. The cameras 330 may comprise pairs of stereo cameras that image the volume 315 and use stereoscopic techniques to determine depth information for the subject. These images, which are captured from different viewpoints, can then be mathematically combined and interpolated by a processor so as to construct a dynamic 3-D model of the subject. The 3-D model can be used to represent the subject from many, or all, viewpoints, including ones which were not actually filmed by the cameras 330. The 3-D model can take various forms, including a polygon mesh or a dynamic unstructured point cloud of the subject.

The images of the subject captured by the capture stage 300 can be used to create a digital representation of the subject and may include a skeleton and an overlying mesh (e.g., to show the outer surface of the subject, which may be skin, clothing, etc.). Digital representations of non-human subjects (e.g., animals or inanimate objects) can also be generated by such imaging techniques. Additionally, digital representations of fictitious characters, creatures, animals, or objects can be created (e.g., characters in a video game).

A digital virtual character, such as a human avatar, can be wholly or partially represented in computer graphics as a polygon mesh. A polygon mesh, or simply "mesh" for short, is a collection of points in a modeled three-dimensional space. The mesh can form a polyhedral object whose surfaces define the body or shape of the virtual character (or a portion thereof). While meshes can include any number of points (within practical limits which may be imposed by available computing power), finer meshes with more points are generally able to portray more realistic virtual characters with finer details that may closely approximate real life people, animals, objects, etc.

Each point in the mesh can be defined by a coordinate in the modeled three-dimensional space. The modeled three-dimensional space can be, for example, a Cartesian space addressed by (x, y, z) coordinates. The points in the mesh are the vertices of the polygons which make up the polyhedral object. Each polygon represents a surface, or face, of the polyhedral object and is defined by an ordered set of vertices, with the sides of each polygon being straight line edges connecting the ordered set of vertices. In some cases, the polygon vertices in a mesh may differ from geometric polygons in that they are not necessarily coplanar in 3D graphics.

In some implementations, a mesh is made up of three-vertex polygons (i.e., triangles or "tris" for short) or four-vertex polygons (i.e., quadrilaterals or "quads" for short). However, higher-order polygons can also be used in some meshes. Meshes are typically quad-based in direct content creation (DCC) applications (e.g., applications such as Maya (available from Autodesk, Inc.) or Houdini (available from Side Effects Software Inc.) which are primarily designed for creating and manipulating 3D computer graphics), whereas meshes are typically tri-based in real-time applications.

Each surface of a polygon in the mesh can be associated with a surface normal (or just normal, for short), which is a vector that is perpendicular to the surface. The surface normal can be associated with, for example, the center of the polygon or a vertex of the polygon.

Color Spaces for Surface Normal Visualization

It may be desirable to visualize the distribution of surface normals associated with an object. The visualization may be 2-D or 3-D images that include a color visual representation of the surface normals. To create the visualization, a color scheme is used to map the surface normals to a color space. Color spaces can include a red, green, blue (RGB) color space, a hue, saturation, value (HSV) color space, a CIE Lab color space, a National Television System Committee (NTSC) color space, or any other color space.

Some color schemes for visualizing the orientation of a particular surface normal, e.g., a vertex normal in a mesh for a virtual object, rely on mean-shifting the normal and mapping the normal to a color space. Other color schemes may include a mapping of the surface normal into an HSV color space to account for the rotation of the surface normal.

Figure 4:
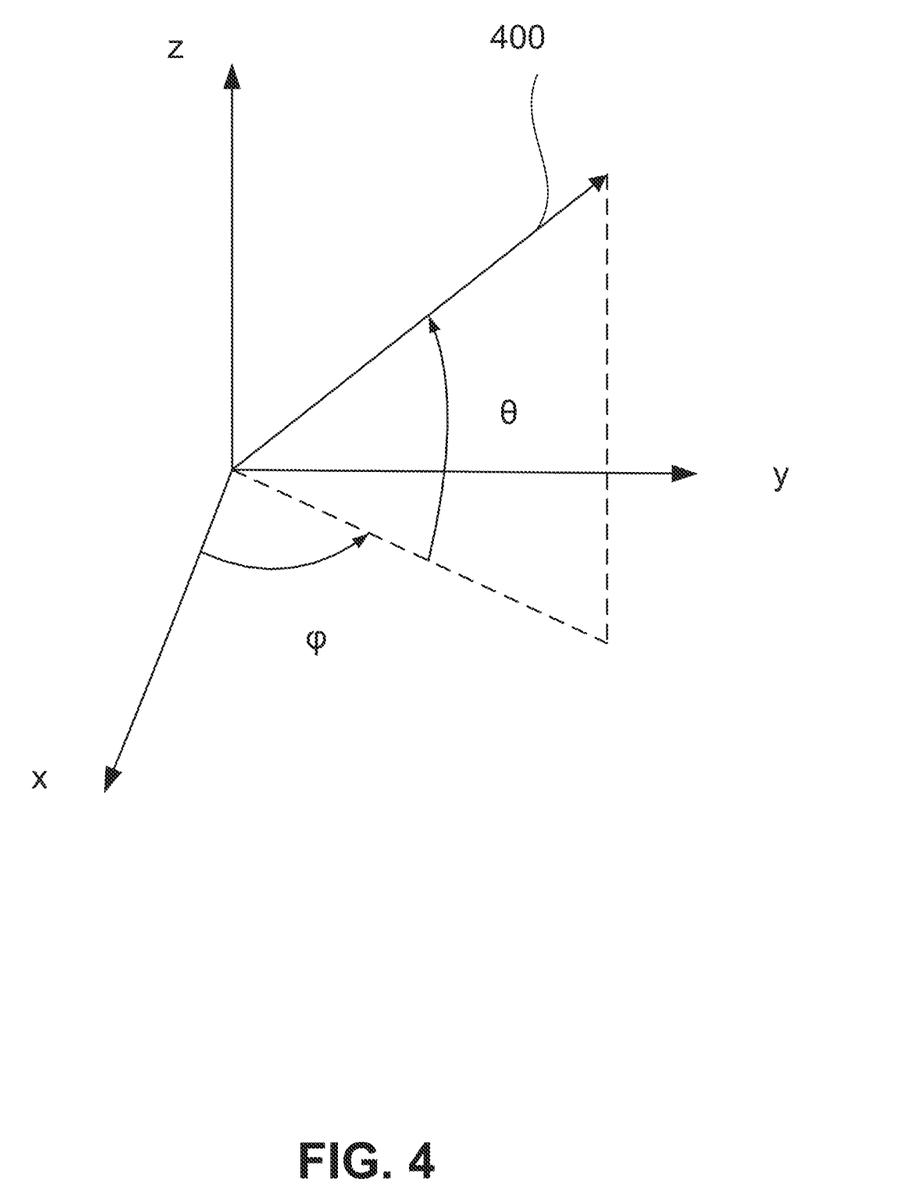
FIG. 4 shows a vector in a Cartesian (x, y, z) coordinate system. The vector can also be represented via azimuth and elevation angles.

With reference to FIG. 4, a surface normal is a 3-D vector 400 that can be represented as three Cartesian coordinates (x, y, z) or as two angles such as azimuth φ and elevation θ. The angular representation may be beneficial for unit vectors (which are normalized to have unit length).

In various implementations, a color scheme may map the 3-D coordinates or the two angles into a color space. It has been found that conventional mappings of the two angles to a color space tend to produce undesirable results. For example, prime colors of the color space may be unevenly distributed or some of the prime colors may not be mapped at all. As another example, an RGB mapping may equate certain unit axes to less saturated colors that are significantly distant from prime colors in the color space.

Accordingly, examples of a color space mapping are described herein that may avoid some or all of these undesirable results. Various non-limiting implementations of this color space mapping are referred to as Octa-RGB, because the mapping involves a mapping of the unit sphere to an octahedron. In some implementations, the Octa-RGB color scheme can map the HUE circle (e.g., a circle comprising maximally saturated colors of all hues) from HSV values onto the unit sphere in a way that every prime color is mapped to one octant of the sphere. The Octa-RGB color space mapping may produce improved or optimal assignment of sphere regions to colors.

Figure 5:
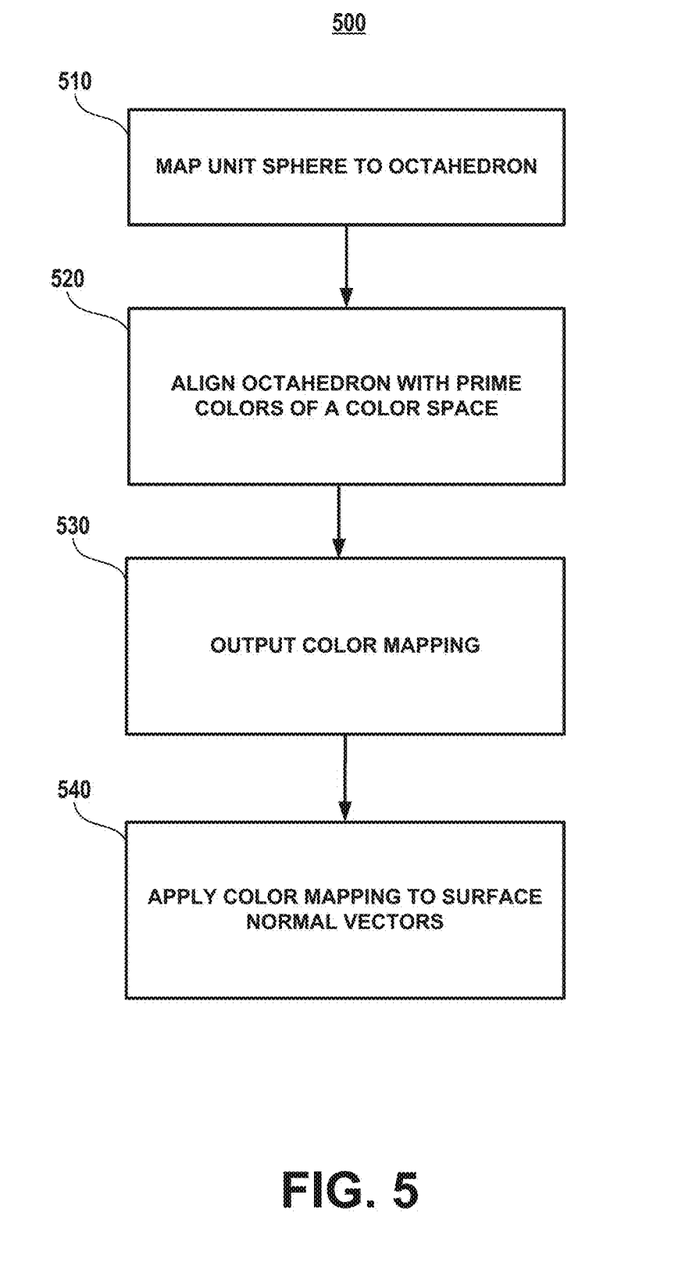
FIG. 5 is a flowchart that illustrates an example method for determining a color mapping for surface normals.

An implementation of the Octa-RGB color scheme will now be described with reference to the method 500 shown in FIG. 5. The method 500 can be performed by computing hardware.

At block 510, the unit sphere in a color space is mapped to an octahedron. As is known from geometry, an octahedron is a polyhedron with eight faces, twelve edges, and six vertices. A regular octahedron is formed from eight equilateral triangles, four of which meet at each vertex of the octahedron. In some implementations of block 510, the mapping is performed using techniques described in "An octahedral equal area partition of the sphere and near optimal configurations of points" by Adrian Holhos and Daniela Roşca, Computers and Mathematics with Applications, vol. 67, pp. 1092-1107, March 2014, which is hereby incorporated by reference herein in its entirety. The mapping may be area preserving, wherein an area of a region on the unit sphere is the same as the area of the region when mapped onto the octahedron.

As an example of this mapping, consider a unit sphere centered at the origin and a regular octahedron of the same area centered at the origin and with vertices on the coordinate axes. The area of each face of the octahedron is π/2, and the length of the edge of the octahedron is $$L = \sqrt{2\pi} / \sqrt[4]{3}.$$

The distance from the origin to each vertex of the octahedron is L/√2. Coordinates of a point on the unit sphere can be represented by Cartesian coordinates (x, y, z) where $x^2+y^2+z^2=1$. The point on the unit sphere can represent the end of a unit surface normal vector. Under the mapping, a point on the sphere at (x, y, z) is mapped to a point on the octahedron with coordinates (X, Y, Z), where $$X = \text{sgn}(x)\frac{L}{\sqrt{2}\,\pi}\sqrt{1-|z|}\left(\pi - 2\arctan\frac{|y|}{|x|}\right), \quad (1)$$

$$Y = \text{sgn}(y)\frac{L}{\sqrt{2}\,\pi}\sqrt{1-|z|}\,\square 2\arctan\frac{|y|}{|x|},$$

$$Z = \text{sgn}(z)\frac{L}{\sqrt{2}}(1 - \sqrt{1-|z|}),$$

where sgn is the sign function and arctan is the arctangent function.

For an angular representation of a surface normal vector, for example as shown in FIG. 4 with azimuth and elevation angles, the mapping from Equation (1) can be applied together with the relationship (x=cos θ cos φ, y=cos θ sin φ, z=sin θ).

At block 520, the method 500 aligns the six vertices of the octahedron with six prime colors of the color space. An advantage of performing this alignment is that the octahedron tends to avoid whitish and blackish colors, which can help to ensure that all colors in the mapping are maximally saturated.

The six prime colors used in some implementations of Octa-RGB are red, green, blue, cyan, magenta, and yellow. The six prime colors may comprise three primary colors of the color space (e.g., red, green, and blue) and three secondary colors formed by mixing two of the primary colors (e.g., cyan is blue plus green, magenta is red plus blue, and yellow is red plus green). In other implementations, additional or different prime colors can be used. The prime colors can be arranged in a color circle with complementary colors being arranged diametrically across from each other on the color circle (e.g., blue and yellow or red and cyan), and analogous colors next to each other on the color circle (e.g., red and magenta or blue and cyan).

In some implementations of block 520, each vertex of the octahedron is identified with a prime color. The vertices of the octahedron can be identified with colors such that complementary colors are not placed at neighboring vertices of the octahedron. Analogous colors may be placed at neighboring vertices of the octahedron. The output of this identification is a list of positions on the octahedron and their corresponding positions in the color space (e.g., RGB). The list can be six-dimensional (6D) including three-dimensional (3D) coordinates for the octahedron positions and 3D coordinates for the color space. As an example, an RGB position for a fully saturated color represented in the HSV color model can be found using the MATLAB function hsv2rgb (available from The MathWorks, Inc., Natwick, Mass.).

To perform the alignment of the six vertices of the octahedron with the six prime colors, a rotation matrix and a shear matrix can be solved for. Both matrices may be solved for in parallel, and the rotation matrix and the shear matrix may be represented as a single rotation and shear matrix. The rotation and shear matrix, A, transforms positions, x, on the octahedron into positions, b, in the color space. The rotation and shear matrix may be determined by solving a matrix equation $$Ax=b, \quad (2)$$

where x and b are known and the rotation and shear matrix A is unknown. In terms of the 6D list described above, the positions x can comprise the first three columns of the 6D list, and the positions b can comprise the last three columns of the 6D list.

Equation (2) can be solved to determine the matrix A using numerical techniques including, for example, least squares, QR-decomposition, singular value decomposition (SVD), etc. As an example, in MATLAB the matrix A can be found by computing A=x/b, which provides the best numerical solution for A in the least squares sense.

The rotation and shear matrix obtained from Equation (2) provides that each vertex of the octahedron touches a specified number of corners of the unit cube (e.g., 1, 2, 3, 4, 5, 6 or more corners). An RGB color can be selected where the RGB color space is co-aligned with the unit cube.

At block 530, the method 500 can output the color mapping (e.g., the rotation and shear matrix A). The rotation and shear matrix A can be applied to transform other points of the unit sphere (e.g., representing other unit surface normal vectors) to the color space. For example, the color mapping can be stored in non-transitory computer memory and, at block 540, can be applied to surface normals of a polygon mesh associated with a virtual object.

A benefit of the Octa-RGB color mapping is that each vertex of the octahedron is ninety degrees away from its neighboring, adjacent vertex, when mapped to the unit sphere. This allows for a segmentation of the unit sphere into eight regions of equal size (one-eighth of the sphere). Each region, following the shear-rotation in the color space, then is dominated by a single prime color. The gradient between those prime colors is visually balanced and allows for gauging of the overall rotation in 3D space of a visualized surface normal. Further, it allows a viewer to gauge how distant in terms of rotation two surface normals are, for example, simply by seeing how far the colors of two surface normals are away from each other in color space. Accordingly, the method 500 can determine a mapping of the unit sphere to the color space using an octahedral and a rotation and shear matrix.

Figure 6:
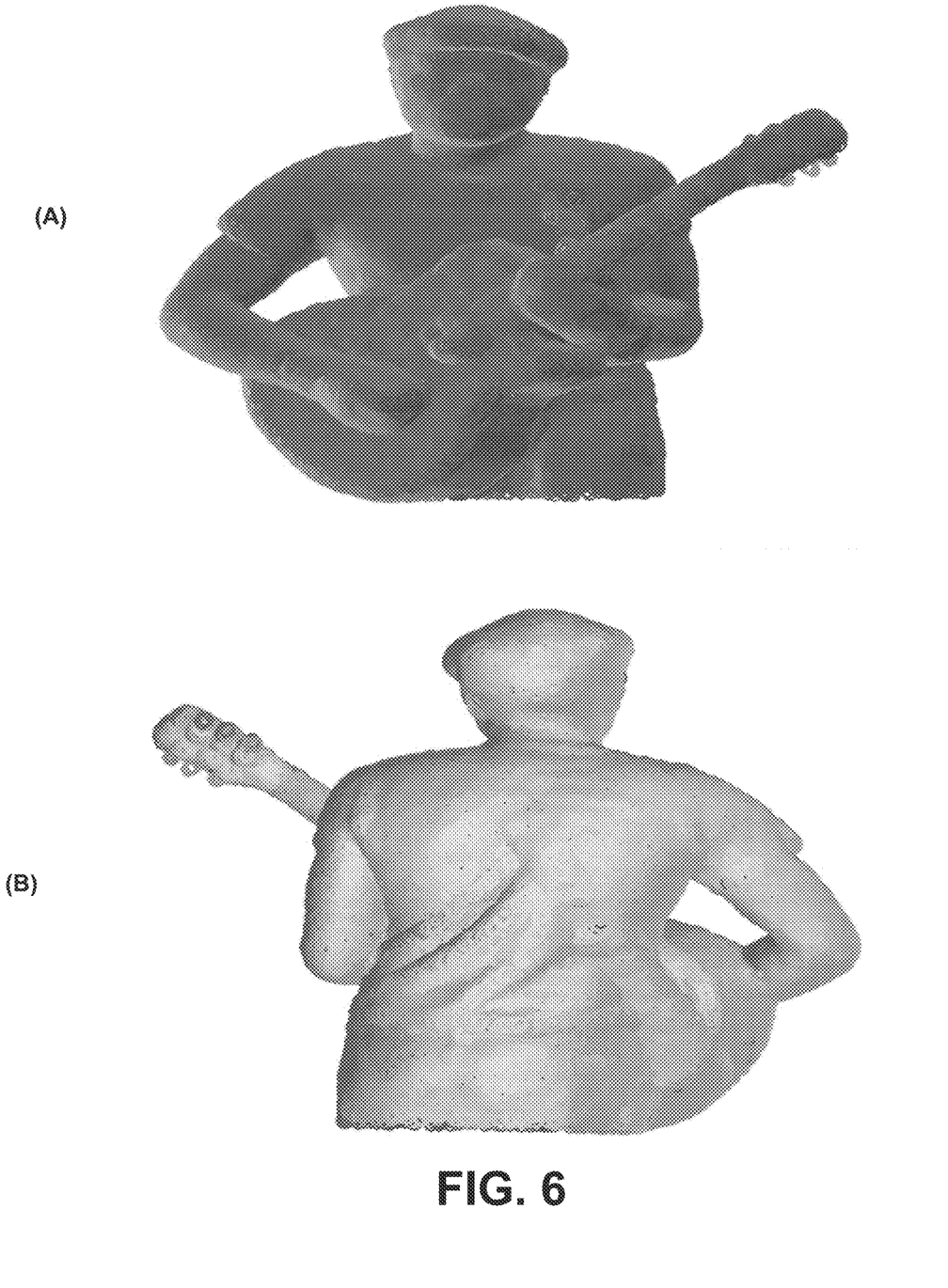
FIG. 6 shows an example of an Octa-RGB visualization of surface normals of a person playing a guitar. Panel (A) shows the front of the person and guitar and panel (B) shows the back of the person and guitar.

FIG. 6 shows an example of an Octa-RGB visualization of surface normals of a person playing a guitar. Panel (A) shows the front of the person and guitar and panel (B) shows the back of the person and guitar. There are 20 million points in the data set for the person and guitar. In this example, the mapping makes use of all six prime colors. Prevalent surface normal directions (e.g., blue, cyan, yellow) show the overall surface orientation of large parts of the dataset. Further, small differences in orientation of the surface normal for neighboring regions of the figure (e.g., the body of the guitar and guitar knobs) become very apparent.

Figure 7:
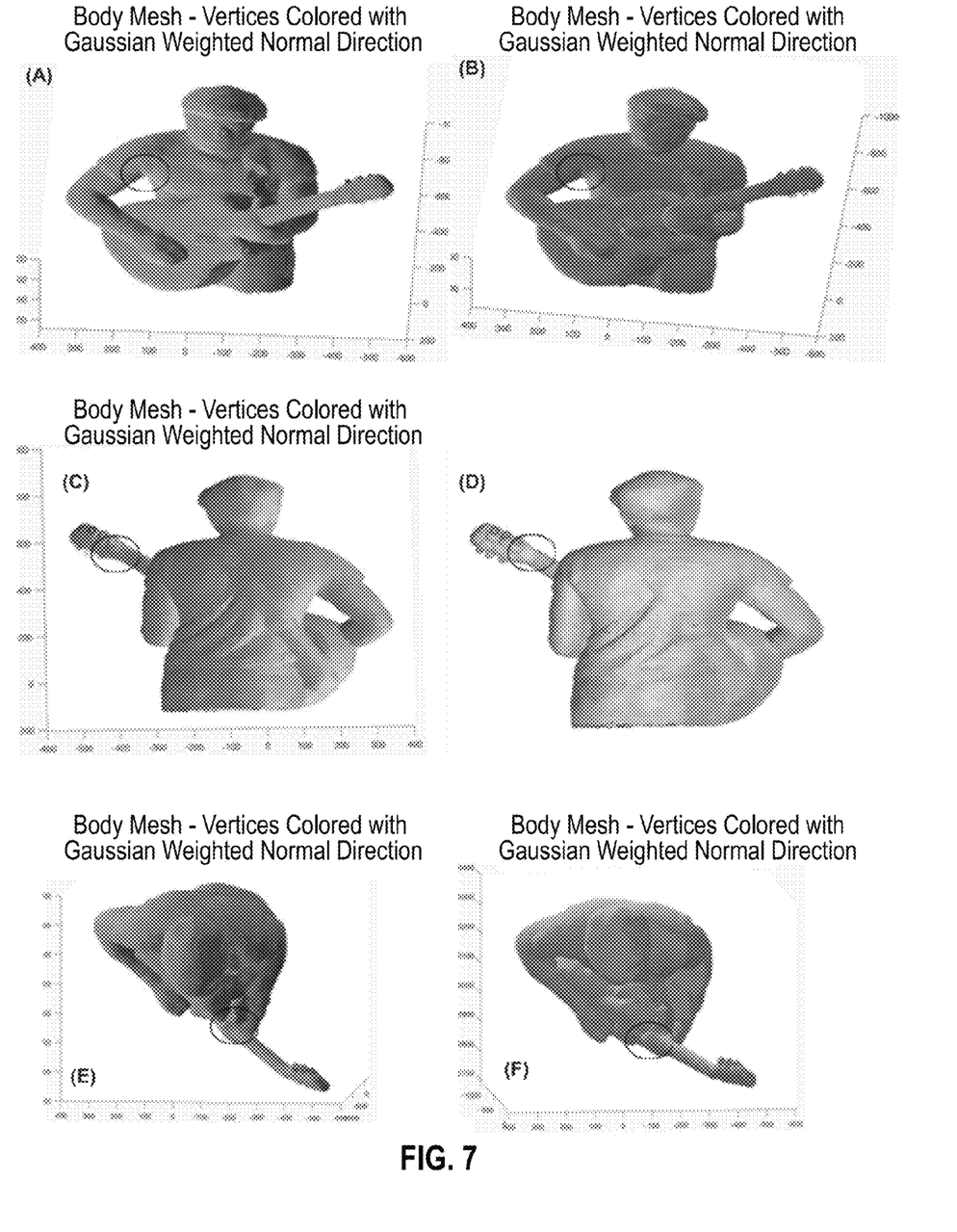
FIG. 7 shows a comparison of the Octa-RGB visualization from FIG. 6 (the right-hand panels (B), (D), and (F)) with a standard colorization of the data set (the left-hand panels (A), (C), and (E)) in which the surface normal is mean-shifted and rendered as an RGB color.

FIG. 7 shows a comparison of the Octa-RGB visualization from FIG. 6 (the right-hand panels (B), (D), and (F)) with a standard colorization of the data set (the left-hand panels (A), (C), and (E)) in which the surface normal is mean-shifted and rendered as an RGB color. As noted above, small differences in orientation of the surface normal are visualized better using the Octa-RGB mapping than with the standard colorization. For example, compare the regions in the ovals to see that small orientation differences are visually represented better using Octa-RGB.

Figure 8:
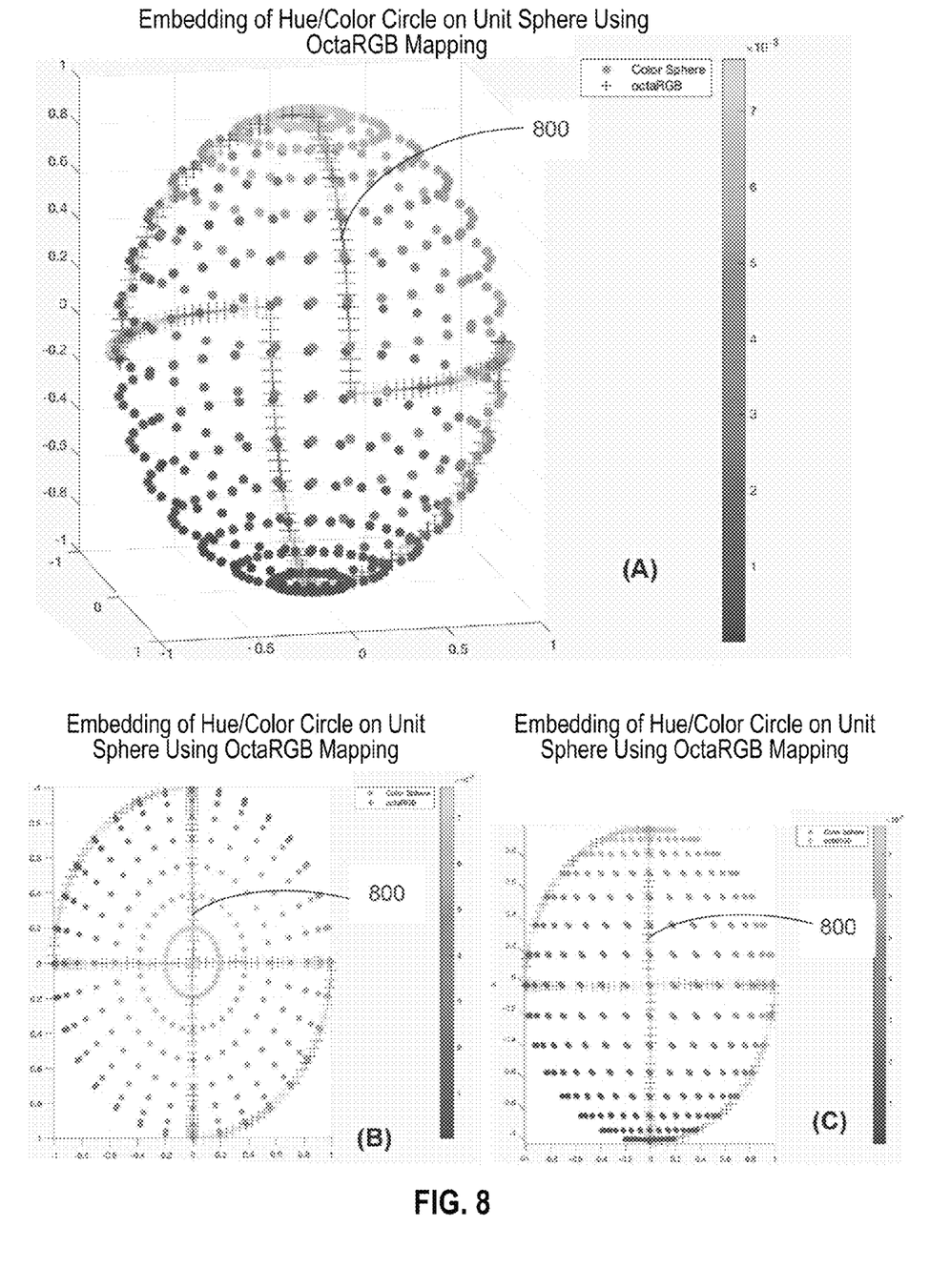
FIG. 8 shows an example of a visualization of the unit color sphere with an embodiment of the Octa-RGB color mapping. Panel (A) is a perspective view, panel (B) is a top view, and panel (C) is a side view of the color sphere. Colored dots are used to show the colors associated with the different regions of the color sphere. For example, yellow is near the top (e.g., North) pole, blue is near the bottom (e.g., South) pole. A path on the color sphere shown with crosses illustrates the path of the HUE circle (maximally saturated colors of all hues) along the sphere under an Octa-RGB mapping.

Implementations of the Octa-RGB color mapping beneficially may provide better or optimal assignment of regions of the sphere to colors as compared to standard colorizations. FIG. 8 shows an example of a visualization of the unit color sphere with an embodiment of the Octa-RGB color mapping. Panel (A) is a perspective view, panel (B) is a top view, and panel (C) is a side view of the color sphere. Colored dots are used to show the colors associated with the different regions of the color sphere. For example, yellow is near the top (e.g., North) pole, blue is near the bottom (e.g., South) pole. A path 800 on the color sphere shown with crosses illustrates the path of the HUE circle (maximally saturated colors of all hues) along the sphere under the Octa-RGB mapping. As can be seen from FIG. 8, the path 800 visits both poles and four equidistantly spaced positions on the equator of the color sphere. Accordingly, the Octa-RGB mapping allows for very intuitive identification of the eight regions of the color sphere by the prime colors of the color space.

Figure 9:
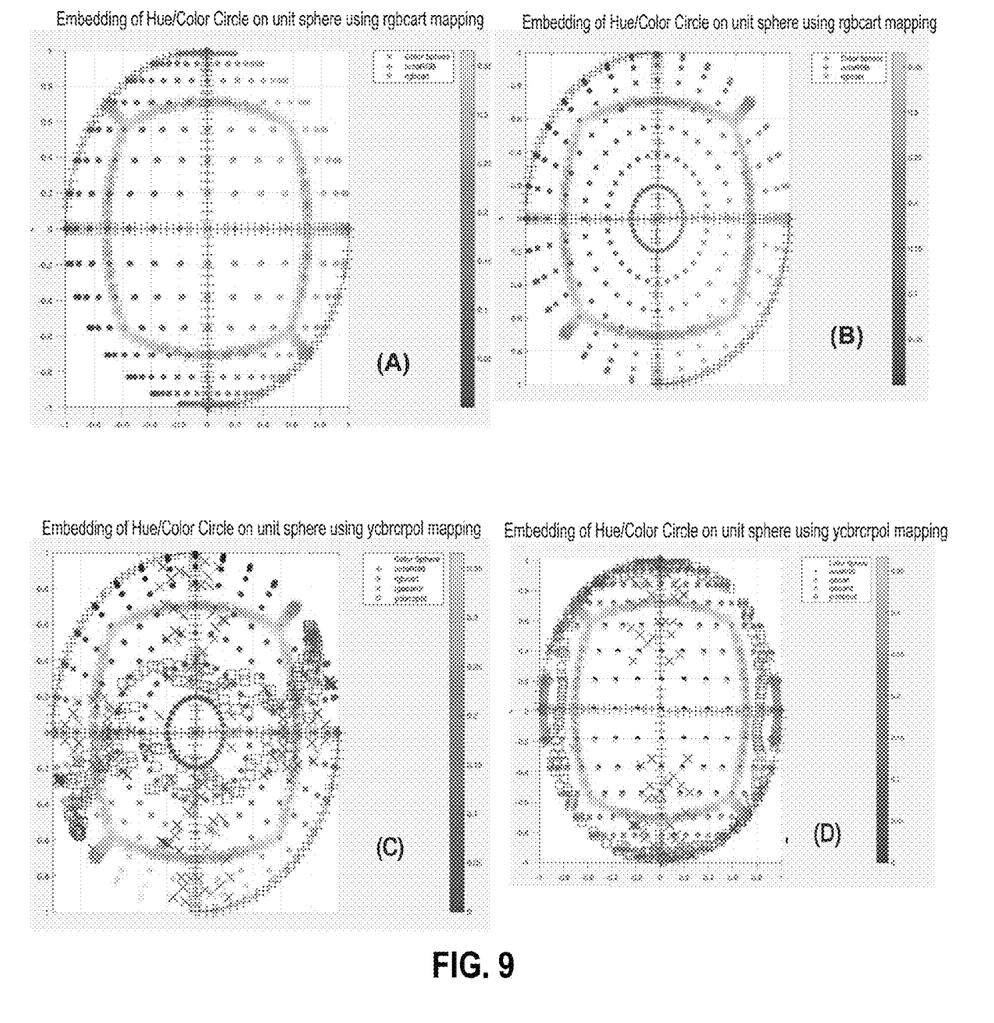
FIG. 9 shows examples of visualizations of the color sphere and HUE circles under an Octa-RGB mapping and other standard mappings (rgbcart in panels (A)-(D), and rgbcart2 and ycbrcpol in panels (C) and (D)).

FIG. 9 shows examples of visualizations of the color sphere and HUE circles under an Octa-RGB mapping (crosses) and other standard mappings (rgbcart in panels (A)-(D), and rgbcart2 and ycbrcpol in panels (C) and (D)). Comparison of FIGS. 8 and 9 shows that in popular color spaces and their mapping of the unit sphere the HUE circle does not reach the poles. Such color mappings result in less saturated colors being the representative color for a given octant of the sphere. Some color spaces cause the HUE circle to be spread out to regions on the sphere, which can produce clipped colors. Octa-RGB outperforms these other color mappings in all cases and provides more intuitive visualization of changes of the orientation of surface normals.

An example implementation, which does not limit the scope of the other embodiments discussed herein, may be partially or fully automated by a computing system and includes the following processes:

1) receive a position on the unit sphere as input. For example, this may be a 3D vector in cartesian coordinates or a 2D vector of spherical angles.

2) compute the same position, but constrained to lie on the surface of an octahedron using the relationships below:

$$L=\mathrm{sqrt}(2*pi)/3\hat{\ }(1./4);$$

$$X=\mathrm{sign}(x(:)).*L./\mathrm{sqrt}(2)./\mathrm{pi}.*\mathrm{sqrt}(1-\mathrm{abs}(z(:))).*(pi-2.*a\ \tan(\mathrm{abs}(y(:))./\mathrm{abs}(x(:)))));$$

$$Y=\mathrm{sign}(y(:)).*L./\mathrm{sqrt}(2)./\mathrm{pi}.*\mathrm{sqrt}(1-\mathrm{abs}(z(:))).*(2.*a\ \tan(\mathrm{abs}(y(:))./\mathrm{abs}(x(:)))));$$

$$Z=\mathrm{sign}(z(:)).*L./\mathrm{sqrt}(2)./\mathrm{pi}.*(1-\mathrm{sqrt}(1-\mathrm{abs}(z(:))));$$

$$\mathrm{out}=\mathrm{cat}(2,X(:),Y(:),Z(:));$$

3) rotate and shear the octahedron such that each corner of the octahedron touches on a corner of the unit cube. As discussed above, the rotation and shearing may be optimized such that the octahedron is as close as possible to (and even perfectly touches in an optimally optimized implementation) all the corners of the unit cube. For example, rotation and shear may be optimized as follows:

rotationAndShearMat=[. . .

. . . ]

outVecs=cat(2,$X(:),Y(:),Z(:)$)*rotationAndShearMat;

$Xi$=outVecs(:,1);

$Yi$=outVecs(:,2);

$Zi$=outVecs(:,3);

out=cat(2,($X$+0.5)./(1),($Y$+0.5)./(1),($Z$+0.5)./(1));

4) The corresponding RGB color is selected and co-aligned with the unit cube.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically pro-grammed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some implementations, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example implementations. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method comprising:
under control of hardware computing circuitry:
mapping a unit sphere in a color space to an octahedron;
aligning the octahedron with prime colors of the color space to provide an aligned octahedron, wherein aligning the octahedron comprises not identifying complementary colors of the color space with neighboring vertices of the octahedron; and
outputting a color mapping associated with the aligned octahedron.

2. The method of claim 1, wherein the color space comprises a red, green, blue (RGB) color space, a hue, saturation, value (HSV) color space, a CIE Lab color space, or a National Television System Committee (NTSC) color space.

3. The method of claim 1, wherein the prime colors comprise three primary colors and three secondary colors of the color space.

4. The method of claim 1, wherein the prime colors comprise red, green, blue, cyan, magenta, and yellow.

5. The method of claim 1, wherein mapping the unit sphere comprises an area-preserving mapping.

6. The method of claim 1, wherein mapping the unit sphere comprises mapping a point (x, y, z) on the unit sphere to a point (X, Y, Z) on the octahedron according to:

$$X = \text{sgn}(x) \frac{L}{\sqrt{2}\pi} \sqrt{1 - |z|} \left(\pi - 2\arctan\frac{|y|}{|x|}\right),$$

$$Y = \text{sgn}(y) \frac{L}{\sqrt{2}\pi} \sqrt{1 - |z|} \cdot 2 \arctan\frac{|y|}{|x|},$$

$$Z = \text{sgn}(z) \frac{L}{\sqrt{2}} (1 - \sqrt{1 - |z|}).$$

7. The method of claim 1, wherein aligning the octahedron comprises aligning each vertex of the octahedron with a prime color of the color space.

8. The method of claim 1, wherein aligning the octahedron comprises identifying analogous colors of the color space with neighboring vertices of the octahedron.

9. The method of claim 1, wherein aligning the octahedron comprises determining a six-dimensional (6D) list comprising three-dimensional (3D) coordinates for positions on the octahedron and 3D coordinates of the color space.

10. The method of claim 1, wherein aligning the octahedron comprises determining a rotation and shear matrix.

11. The method of claim 10, wherein determining the rotation and shear matrix comprises utilizing a least squares technique.

12. The method of claim 10, wherein the rotation and shear matrix provides that each vertex of the octahedron touches a specified number of corners of a unit cube.

13. The method of claim 1, further comprising applying the color mapping to a surface normal.

14. The method of claim 13, wherein the surface normal is associated with a mesh for a virtual object.

15. The method of claim 1, further comprising utilizing the color mapping to generate a visualization of surface normals.

16. A system comprising:
hardware computing circuitry configured to:
map a unit sphere in a color space to an octahedron;
align the octahedron with prime colors of the color space to provide an aligned octahedron, wherein aligning the octahedron comprises not identifying complementary colors of the color space with neighboring vertices of the octahedron; and
output a color mapping associated with the aligned octahedron.

17. The system of claim 16, wherein to map the unit sphere the hardware circuitry is configured to utilize an area-preserving mapping.

18. The system of claim 16, wherein to map the unit sphere, the hardware circuitry is configured to map a point (x, y, z) on the unit sphere to a point (X, Y, Z) on the octahedron according to:

$$X = \text{sgn}(x) \frac{L}{\sqrt{2}\pi} \sqrt{1-|z|} \left(\pi - 2\arctan\frac{|y|}{|x|}\right),$$

$$Y = \text{sgn}(y) \frac{L}{\sqrt{2}\pi} \sqrt{1-|z|} \cdot 2 \arctan\frac{|y|}{|x|},$$

$$Z = \text{sgn}(z) \frac{L}{\sqrt{2}} \left(1 - \sqrt{1-|z|}\right).$$

19. The system of claim 18, wherein the hardware circuitry is further configured to apply the color mapping to a surface normal.

* * * * *